(12) United States Patent
Khawand et al.

(10) Patent No.: US 9,785,174 B2
(45) Date of Patent: Oct. 10, 2017

(54) PREDICTIVE TRANSMISSION POWER CONTROL FOR BACK-OFF

(71) Applicant: Microsoft Corporation, Redmond, WA (US)

(72) Inventors: Charbel Khawand, Sammamish, WA (US); Sean Mercer, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/506,478

(22) Filed: Oct. 3, 2014

(65) Prior Publication Data

US 2016/0098053 A1    Apr. 7, 2016

(51) Int. Cl.
| H04B 7/00 | (2006.01) |
| G05F 3/02 | (2006.01) |
| H04W 52/28 | (2009.01) |
| H04W 52/36 | (2009.01) |

(52) U.S. Cl.
CPC ............ *G05F 3/02* (2013.01); *H04W 52/281* (2013.01); *H04W 52/362* (2013.01); *H04W 52/367* (2013.01); *H04W 52/283* (2013.01); *Y02B 60/50* (2013.01)

(58) Field of Classification Search
None
See application file for complete search history.

(56) References Cited

U.S. PATENT DOCUMENTS

| 4,016,490 A | 4/1977 | Weckenmann et al. |
| 4,729,129 A | 3/1988 | Koerner |
| 4,806,944 A | 2/1989 | Jacomb-Hood |
| 5,166,679 A | 11/1992 | Vranish et al. |
| 5,212,621 A | 5/1993 | Panter |
| 5,408,690 A | 4/1995 | Ishikawa et al. |
| 5,564,086 A | 10/1996 | Cygan et al. |
| 6,178,310 B1 | 1/2001 | Jeong |
| 6,657,595 B1 | 12/2003 | Phillips et al. |
| 6,989,745 B1 | 1/2006 | Milinusic et al. |

(Continued)

FOREIGN PATENT DOCUMENTS

| CN | 1179864 A | 4/1998 |
| CN | 100504407 C | 9/2006 |

(Continued)

OTHER PUBLICATIONS

International Searching Authority, U.S. Patent and Trademark Office, International Search Report and Written Opinion for PCT/US2015/052769, dated Feb. 17, 2016, 27 pages.

(Continued)

*Primary Examiner* — Tuan A Tran

(74) *Attorney, Agent, or Firm* — Holzer Patel Drennan

(57) ABSTRACT

An electronic device disclosed herein includes mechanisms for modeling and dynamically controlling transmission power of an electronic device. The electronic device determines a back-off function defining at least one transmission power adjustment that is effective to adjust a predicted average energy emanating from an electronic device over the future time interval to satisfy a power condition. Power of the electronic device is adjusted according to the back-off function responsive to satisfaction of a proximity condition.

19 Claims, 4 Drawing Sheets

(56) References Cited

U.S. PATENT DOCUMENTS

| | | |
|---|---|---|
| 7,009,944 B1* | 3/2006 | Hulbert ............... H04W 52/223 370/252 |
| 7,053,629 B2 | 5/2006 | Nevermann |
| 7,062,288 B2* | 6/2006 | Raaf ................... H04W 52/221 370/318 |
| 7,071,776 B2 | 7/2006 | Forrester et al. |
| 7,124,193 B1* | 10/2006 | Leung .................. H04L 1/0003 709/217 |
| 7,146,139 B2 | 12/2006 | Nevermann |
| 7,151,382 B1 | 12/2006 | Kean et al. |
| 7,162,264 B2 | 1/2007 | Vance |
| 7,167,093 B2 | 1/2007 | Fergusson |
| 7,541,874 B2 | 6/2009 | Maeda et al. |
| 7,729,715 B2* | 6/2010 | Love .................... H04W 52/52 370/336 |
| 7,917,175 B2 | 3/2011 | Song et al. |
| 8,063,375 B2 | 11/2011 | Cobbinah et al. |
| 8,134,461 B2 | 3/2012 | Van Doorn |
| 8,208,423 B2* | 6/2012 | Liu ....................... H04W 52/12 370/318 |
| 8,213,982 B2 | 7/2012 | Marlett et al. |
| 8,269,511 B2 | 9/2012 | Jordan |
| 8,324,549 B2 | 12/2012 | Romero et al. |
| 8,326,385 B2 | 12/2012 | Brogle et al. |
| 8,401,851 B2 | 3/2013 | Bushey et al. |
| 8,417,296 B2 | 4/2013 | Caballero et al. |
| 8,432,322 B2 | 4/2013 | Amm et al. |
| 8,442,572 B2* | 5/2013 | Borran ................. H04W 52/16 370/318 |
| 8,466,839 B2 | 6/2013 | Schlub et al. |
| 8,483,632 B2 | 7/2013 | Asrani et al. |
| 8,515,496 B2 | 8/2013 | Cheng et al. |
| 8,547,952 B2* | 10/2013 | Liu ....................... H04L 1/0022 370/241 |
| 8,548,388 B2 | 10/2013 | Chiu et al. |
| 8,559,999 B2* | 10/2013 | Hu ....................... H04W 52/241 370/318 |
| 8,565,205 B2 | 10/2013 | Ho et al. |
| 8,577,289 B2 | 11/2013 | Schlub et al. |
| 8,630,596 B2 | 1/2014 | Harel et al. |
| 8,723,531 B2 | 5/2014 | Harrison |
| 8,723,749 B2 | 5/2014 | Lin et al. |
| 8,775,103 B1 | 7/2014 | Jayaraj et al. |
| 8,781,437 B2 | 7/2014 | Ngai et al. |
| 8,792,930 B1 | 7/2014 | Gopalakrishnan et al. |
| 8,798,695 B1 | 8/2014 | Zheng et al. |
| 8,860,526 B2 | 10/2014 | Manssen et al. |
| 8,922,443 B2 | 12/2014 | Zhu et al. |
| 8,975,903 B2 | 3/2015 | Salter et al. |
| 9,325,355 B2 | 4/2016 | Pecen et al. |
| 9,337,833 B2 | 5/2016 | Siska |
| 9,466,872 B2 | 10/2016 | Sanchez et al. |
| 9,531,420 B1 | 12/2016 | Prendergast et al. |
| 2002/0009976 A1 | 1/2002 | Rashidi |
| 2002/0039028 A1 | 4/2002 | Douglas et al. |
| 2002/0175814 A1 | 11/2002 | Wadlow et al. |
| 2003/0064732 A1 | 4/2003 | McDowell et al. |
| 2003/0064761 A1 | 4/2003 | Nevermann |
| 2003/0210203 A1 | 11/2003 | Phillips et al. |
| 2003/0214310 A1 | 11/2003 | McIntosh |
| 2003/0228846 A1 | 12/2003 | Berliner et al. |
| 2004/0021608 A1 | 2/2004 | Kojima et al. |
| 2004/0075613 A1 | 4/2004 | Jarmuszewski et al. |
| 2004/0093624 A1 | 5/2004 | French et al. |
| 2004/0108957 A1 | 6/2004 | Umehara et al. |
| 2004/0113847 A1 | 6/2004 | Qi et al. |
| 2004/0160378 A1 | 8/2004 | Abrams et al. |
| 2004/0222925 A1 | 11/2004 | Fabrega-Sanchez et al. |
| 2005/0017906 A1 | 1/2005 | Man et al. |
| 2005/0184914 A1 | 8/2005 | Ollikainen et al. |
| 2006/0244663 A1 | 11/2006 | Fleck et al. |
| 2007/0037619 A1 | 2/2007 | Matsunaga et al. |
| 2007/0111681 A1 | 5/2007 | Alberth, Jr. et al. |
| 2007/0120745 A1 | 5/2007 | Qi et al. |
| 2007/0122307 A1 | 5/2007 | Da Costa et al. |
| 2008/0051165 A1 | 2/2008 | Burgan et al. |
| 2008/0055160 A1 | 3/2008 | Yong-Jin et al. |
| 2008/0158065 A1 | 7/2008 | Wee |
| 2008/0218493 A1 | 9/2008 | Patten et al. |
| 2008/0254836 A1 | 10/2008 | Qi et al. |
| 2009/0033562 A1 | 2/2009 | Takeuchi et al. |
| 2009/0047998 A1 | 2/2009 | Alberth, Jr. |
| 2009/0230884 A1 | 9/2009 | Van Doorn |
| 2009/0253459 A1 | 10/2009 | Naganuma et al. |
| 2009/0295648 A1 | 12/2009 | Dorsey et al. |
| 2009/0305742 A1 | 12/2009 | Caballero |
| 2009/0325511 A1 | 12/2009 | Kim |
| 2010/0026664 A1 | 2/2010 | Geaghan |
| 2010/0052997 A1 | 3/2010 | Kan et al. |
| 2010/0056210 A1 | 3/2010 | Bychkov et al. |
| 2010/0067419 A1* | 3/2010 | Liu ....................... H04W 52/12 370/311 |
| 2010/0113111 A1 | 5/2010 | Wong et al. |
| 2010/0234058 A1* | 9/2010 | Hu ....................... H04B 17/373 455/522 |
| 2010/0234081 A1 | 9/2010 | Wong et al. |
| 2010/0279751 A1 | 11/2010 | Pourseyed et al. |
| 2010/0283691 A1 | 11/2010 | Xiaomeng et al. |
| 2010/0317302 A1 | 12/2010 | Greenwood et al. |
| 2010/0321325 A1 | 12/2010 | Springer et al. |
| 2011/0001675 A1 | 1/2011 | Lee |
| 2011/0012793 A1 | 1/2011 | Amm et al. |
| 2011/0012794 A1 | 1/2011 | Schlub et al. |
| 2011/0043408 A1 | 2/2011 | Shi et al. |
| 2011/0063042 A1 | 3/2011 | Mendolia et al. |
| 2011/0117973 A1 | 5/2011 | Asrani et al. |
| 2011/0124363 A1 | 5/2011 | Calvarese et al. |
| 2011/0157077 A1 | 6/2011 | Martin et al. |
| 2011/0199267 A1 | 8/2011 | Hayashi |
| 2011/0222469 A1 | 9/2011 | Ali et al. |
| 2011/0250928 A1 | 10/2011 | Schlub et al. |
| 2011/0298669 A1 | 12/2011 | Rao |
| 2012/0021707 A1 | 1/2012 | Forrester et al. |
| 2012/0021800 A1 | 1/2012 | Rao |
| 2012/0023225 A1 | 1/2012 | Imes et al. |
| 2012/0032951 A1 | 2/2012 | Elin |
| 2012/0044115 A1 | 2/2012 | Mccaughey et al. |
| 2012/0071195 A1 | 3/2012 | Chakraborty et al. |
| 2012/0074961 A1 | 3/2012 | Herrmann |
| 2012/0133561 A1 | 5/2012 | Konanur et al. |
| 2012/0147801 A1 | 6/2012 | Ho et al. |
| 2012/0164962 A1 | 6/2012 | Lin et al. |
| 2012/0172079 A1 | 7/2012 | Baldemair et al. |
| 2012/0178494 A1 | 7/2012 | Haim et al. |
| 2012/0190398 A1 | 7/2012 | Leukkunen |
| 2012/0210105 A1 | 8/2012 | Sagae et al. |
| 2012/0211784 A1 | 8/2012 | Kazmi |
| 2012/0214422 A1 | 8/2012 | Shi et al. |
| 2012/0215847 A1 | 8/2012 | Li et al. |
| 2012/0223865 A1 | 9/2012 | Li et al. |
| 2012/0270519 A1 | 10/2012 | Ngai et al. |
| 2012/0270592 A1 | 10/2012 | Ngai et al. |
| 2012/0276861 A1 | 11/2012 | Isobe et al. |
| 2012/0295554 A1 | 11/2012 | Greene et al. |
| 2012/0298497 A1 | 11/2012 | Maeda et al. |
| 2012/0299772 A1 | 11/2012 | Shtrom et al. |
| 2012/0329524 A1 | 12/2012 | Kent et al. |
| 2013/0005413 A1 | 1/2013 | Brogle et al. |
| 2013/0016621 A1 | 1/2013 | Kil et al. |
| 2013/0026846 A1 | 1/2013 | Gianesello et al. |
| 2013/0033400 A1 | 2/2013 | Chiang |
| 2013/0045700 A1 | 2/2013 | Stallman et al. |
| 2013/0050046 A1 | 2/2013 | Jarvis et al. |
| 2013/0051261 A1 | 2/2013 | Kazmi et al. |
| 2013/0060517 A1 | 3/2013 | Sanchez |
| 2013/0120257 A1 | 5/2013 | Park et al. |
| 2013/0122827 A1 | 5/2013 | Ali et al. |
| 2013/0127677 A1 | 5/2013 | Lin et al. |
| 2013/0133827 A1 | 5/2013 | Ali et al. |
| 2013/0137487 A1 | 5/2013 | Sato |
| 2013/0149957 A1 | 6/2013 | Desclos et al. |
| 2013/0157564 A1 | 6/2013 | Curtis et al. |
| 2013/0169348 A1 | 7/2013 | Shi |

(56) References Cited

U.S. PATENT DOCUMENTS

| | | | |
|---|---|---|---|
| 2013/0178167 A1 | 7/2013 | Lockerbie et al. | |
| 2013/0178174 A1 | 7/2013 | Geris et al. | |
| 2013/0200618 A1 | 8/2013 | Yarga et al. | |
| 2013/0203363 A1 | 8/2013 | Gratt et al. | |
| 2013/0210106 A1 | 8/2013 | Wang et al. | |
| 2013/0210477 A1 | 8/2013 | Peter | |
| 2013/0217342 A1 | 8/2013 | Abdul-Gaffoor et al. | |
| 2013/0241670 A1 | 9/2013 | Mikhemar et al. | |
| 2013/0278474 A1 | 10/2013 | Lenormand et al. | |
| 2013/0293244 A1 | 11/2013 | Leek | |
| 2013/0314365 A1 | 11/2013 | Woolley et al. | |
| 2013/0335291 A1 | 12/2013 | Judson et al. | |
| 2014/0015547 A1 | 1/2014 | Bottomley et al. | |
| 2014/0015595 A1 | 1/2014 | Van Ausdall et al. | |
| 2014/0021801 A1 | 1/2014 | Kao et al. | |
| 2014/0066124 A1 | 3/2014 | Novet | |
| 2014/0071008 A1 | 3/2014 | Desclos et al. | |
| 2014/0078094 A1 | 3/2014 | Yang | |
| 2014/0087663 A1 | 3/2014 | Burchill et al. | |
| 2014/0098491 A1 | 4/2014 | Wang | |
| 2014/0098693 A1 | 4/2014 | Tabet et al. | |
| 2014/0128032 A1 | 5/2014 | Muthukumar | |
| 2014/0139380 A1 | 5/2014 | Ouyang et al. | |
| 2014/0141733 A1 | 5/2014 | Wong et al. | |
| 2014/0152121 A1 | 6/2014 | Ku | |
| 2014/0155000 A1 | 6/2014 | Erkens | |
| 2014/0159980 A1 | 6/2014 | Finegold | |
| 2014/0173269 A1 | 6/2014 | Varoglu et al. | |
| 2014/0176938 A1 | 6/2014 | Yang et al. | |
| 2014/0177371 A1 | 6/2014 | Abbasi et al. | |
| 2014/0206297 A1 | 7/2014 | Schlub et al. | |
| 2014/0274188 A1 | 9/2014 | Thorson | |
| 2014/0274189 A1* | 9/2014 | Moller | H04W 52/367 455/522 |
| 2014/0280450 A1 | 9/2014 | Luna | |
| 2014/0292587 A1 | 10/2014 | Yarga et al. | |
| 2014/0307570 A1 | 10/2014 | Hong | |
| 2014/0315592 A1 | 10/2014 | Schlub et al. | |
| 2014/0357207 A1 | 12/2014 | Ma | |
| 2014/0357313 A1 | 12/2014 | Mercer et al. | |
| 2014/0370929 A1 | 12/2014 | Khawand et al. | |
| 2015/0022206 A1 | 1/2015 | Adolf et al. | |
| 2015/0031408 A1 | 1/2015 | Kalla et al. | |
| 2015/0053575 A1 | 2/2015 | Bridges et al. | |
| 2015/0141080 A1 | 5/2015 | Standing | |
| 2015/0169093 A1 | 6/2015 | Nakao | |
| 2015/0177371 A1 | 6/2015 | Abbasi et al. | |
| 2014/0201385 A1 | 7/2015 | Mercer et al. | |
| 2015/0199042 A1 | 7/2015 | Standing et al. | |
| 2015/0200444 A1 | 7/2015 | Mercer et al. | |
| 2015/0201387 A1 | 7/2015 | Khawand et al. | |
| 2015/0288074 A1 | 10/2015 | Harper et al. | |
| 2015/0382307 A1 | 12/2015 | Harper et al. | |
| 2016/0049978 A1 | 2/2016 | Mercer et al. | |
| 2016/0064801 A1 | 3/2016 | Han et al. | |
| 2016/0164563 A1 | 6/2016 | Khawand et al. | |
| 2016/0204836 A1 | 7/2016 | Lee et al. | |

FOREIGN PATENT DOCUMENTS

| | | |
|---|---|---|
| CN | 102064812 A | 5/2011 |
| CN | 102077234 A | 5/2011 |
| CN | 202276339 U | 6/2012 |
| CN | 102714346 A | 10/2012 |
| CN | 103248747 A | 8/2013 |
| EP | 84321 | 5/1999 |
| EP | 1298809 | 4/2003 |
| EP | 1469550 A3 | 12/2004 |
| EP | 1732167 A1 | 12/2006 |
| EP | 2015548 B1 | 2/2010 |
| EP | 2276108 A1 | 1/2011 |
| EP | 2381527 A1 | 10/2011 |
| EP | 2383364 A1 | 11/2011 |
| EP | 2405534 A1 | 1/2012 |
| EP | 2410661 A1 | 1/2012 |
| EP | 2509229 | 10/2012 |
| EP | 2509229 A1 | 10/2012 |
| EP | 2568605 A1 | 3/2013 |
| EP | 2787780 A1 | 10/2014 |
| GB | 2293277 A | 3/1996 |
| GB | 2380359 | 4/2003 |
| GB | 2409345 A1 | 6/2004 |
| JP | 2002043957 A | 2/2002 |
| JP | 2007194995 A | 8/2007 |
| WO | 200042797 | 7/2000 |
| WO | 0148858 A3 | 7/2001 |
| WO | 2004015813 A1 | 2/2004 |
| WO | 2004091046 A1 | 10/2004 |
| WO | 2005018046 A1 | 2/2005 |
| WO | 2007043150 A1 | 4/2007 |
| WO | 20090149023 A1 | 12/2009 |
| WO | 2011051554 A1 | 5/2011 |
| WO | 2011058128 A1 | 5/2011 |
| WO | 2012152103 A1 | 2/2012 |
| WO | 2012061582 | 5/2012 |
| WO | 2012091651 | 7/2012 |
| WO | 2012113754 | 8/2012 |
| WO | 2012122113 A1 | 9/2012 |
| WO | 2012122116 | 9/2012 |
| WO | 2012143936 | 10/2012 |
| WO | 2012176217 A1 | 12/2012 |
| WO | 2013011352 A1 | 1/2013 |
| WO | 2013101106 | 7/2013 |
| WO | 2013103948 | 7/2013 |
| WO | 2013165419 | 7/2013 |
| WO | 2013141791 A1 | 9/2013 |
| WO | 2013169527 A1 | 11/2013 |
| WO | 2014036532 A1 | 3/2014 |
| WO | 2015134117 A1 | 9/2015 |
| WO | 2016111897 A1 | 7/2016 |

OTHER PUBLICATIONS

"Digital, Silicon Microphone has 2.6 X 1.6mm2 Footprint", Published on: Dec. 12, 2005, Available at: http://news.thomasnet.com/fullstory/Digital-Silicon-Microphone-has-2-6-x-1-6-mm-footprint-471386.

Khawand, et al., "Radiating Structure with Integrated Proximity Sensing" formerly titled as "SAR Sensor Execution where Part of One or More Antennas is on the Exterior Surface of a Mobile Device", unfiled U.S. Appl.

Holopainen, et al., "Broadband Equivalent Circuit Model for Capacitive Coupling Element-Based Mobile Terminal Antenna", In IEEE Antennas and Wireless Propagation Letters, vol. 9, Jul. 8, 2010, 4 pages.

Ozyalcin, et al., "SAR Simulations in Wireless Communication and Safety Discussions in the Society", In Proceedings of Turkish Journal of Electrical Engineering & Computer Sciences, vol. 10, Issue 2, Dec. 31, 2013, 16 pages.

U.S. Appl. No. 13/918846, PAI, et al., "Radio Frequency (RF) Power Back-Off Optimization for Specific Absorption Rate (SAR) Compliance", Filed Date: Jun. 14, 2013.

International Searching Authority, United States Patent and Trademark Office, International Search Report and Written Opinion for Application No. PCT/US2014/072411, Mar. 27, 2015, 10 Pageswebspace/disk/AudenSARSolutiondatasheet_110927.pdf.

"Semtech Launches Smart Proximity Sensor for Short-Range Human Presence Detection & SAR Regulations in Mobile & Tablet PC Applications", Published on: Jul. 24, 2012, Available at: http://www.semtech.com/Press-Releases/2012/Semtech-Launches-Smart-Proximity-Sensor-for-Short-Range-Human-Presence-Detection-SAR-Regulations-in-Mobile-Tablet-PC-Applications.html.

Toit, Riaan Du, "Using Proximity Sensing to Meet Mobile Device FCC SAR Reulations", Published on: Apr. 17, 2012, Available at: http://www.eetimes.com/General/PrintView/431201.

Khawand, et al.,' "Radio Frequency (RF) Power Back-Off Optimization for Specific Abdorption Rate (SAR) Compliance", U.S. Appl. No. 13/918,846, Jun. 14, 2013, 40 pages.

(56) References Cited

OTHER PUBLICATIONS

Mercer, et al.,' "Specific Absorption Rate Mitigation", U.S. Appl. No. 13/905,088, May 19, 2013, 53 pages.
International Searching Authority, United States Patent and Trademark Office, International Search Report and Written Opinion for Application No. PCT/US2014/042023, Aug. 29, 2014, 11 Pages.
International Searching Authority, United States Patent and Trademark Office, International Search Report and Written Opinion for Application No. PCT/US2014/039479, Sep. 19, 2014, 11 Pages.
International Searching Authority, United States Patent and Trademark Office, International Search Report and Written Opinion for Application No. PCT/US2014/072412, Mar. 30, 2015, 11 pages.
International Searching Authority, United States Patent and Trademark Office, International Search Report and Written Opinion for Application No. PCT/US2014/072414, Apr. 14, 2015, 9 Pages.
"Non-Final Office Action", U.S. Appl. No. 13/905,088, Mar. 23, 2015, 37 pages.
"Non-Final Office Action", U.S. Appl. No. 14/152,351, Feb. 20, 2015, 9 pages.
Second Written Opinion of the International Preliminary Examining Authority, Application No. PCT/US2014/042023, dated: Mar. 2, 2015; 6 Pages.
Mrazovac, "Reaching the Next Level of Indoor Human Presence Detection: An RF Based Solution", 11th International Conference on Telecommunications in Modern Satellite, Cable and Broadcasting Services, Oct. 16, 2013, 4 pages.
International Searching Authority, U.S. Patent and Trademark Office, International Search Report for PCT/US2014/072411, dated Mar. 27, 2015, 4 pages.
International Searching Authority, U.S. Patent and Trademark Office, Written Opinion for PCT/US2014/072411, dated Mar. 27, 2015, 6 pages.
I.B. Bonev et al, "Parmetric Study of Antenna with Parasitic Element for Improving the Hearing Aids Compatibility of Mobile Phones and the Specific Absorption Rate in the Head", Proceedings in Progress in Electromagnetics Research Symposium, Marrakesh, Morocco, Mar. 20-23, 2011, 5 pages.
J. Poutanen, "Interaction Between Mobile Terminal Antenna and User" Helsinki University of Technology Master's Thesis, Oct. 9, 2007, 100 pages.
Poutanent, et al., "Behavior of Mobile Terminal Antennas near Human Tissue at a Wide Frequency Range", In International Workshop on Antenna Technology: Small Antennas and Novel Metamaterials, Mar. 4, 2008, 4 pages.
Sterner, et al., "Development of an Antenna Sensor for Occupant Detection in Passenger Transportation", In Proceedings of Procedia Engineering, vol. 47, Sep. 9, 2012, 6 pages.
Curto, et al., "Circular Loop Antenna Operating at 434 MHz for Medical Applications: Loop-Tissue Interaction", In Proceeding of: Irish Signals and Systems Conference, Jul., 2006, 6 pages.
International Searching Authority, U.S. Patent and Trademark Office, Updated Search Report for PCT/US2014/072412, dated Aug. 5, 2015, 3 pages.
International Searching Authority, U.S. Patent and Trademark Office, Updated Written Opinion for PCT/US2014/072412, dated Oct. 5, 2015, 8 pages.
International Searching Authority, U.S. Patent and Trademark Office, Search Report and Written Opinion or PCT/US2014/072413, dated Jul. 16, 2015, 16 pages.
"SAR Evaluation Considerations for Laptop, Notebook, Netbook and Tablet Computers," Federal Communications Commission Office of Engineering and Technology Laboratory Division, May 28, 2013, 14 pages.
Hochwald, et al "Minimizing Exposure to Electromagnetic Radiation in Portable Devices", In Proceedings of Information Theory and Applications Workshop, Feb. 5, 2012, p. 107.
International Searching Authority, United States Patent and Trademark Office, International Preliminary Report on Patentability, Application No. PCT/US2014/039479, dated Jun. 15, 2015, 8 pages.
International Searching Authority, United States Patent and Trademark Office, Second International Search Report and Written Opinion for PCT/US2014/072412; dated Oct. 5, 2015, 11 pages.
Myllymaki, Sami "Capacitive Antenna Sensor for Proximity Recognition"; http://herkules.ouluNisbn9789514299155/sbn9789514299155.pdf, dated Nov. 30, 2012, 60 pages.
International Searching Authority, United States Patent and Trademark Office, Search Report and Written Opinion for PCT/US2014/065856, dated Feb. 4, 2015, 10 pages.
International Searching Authority, United States Patent and Trademark Office, Second Written Opinion of Pea for PCT/US2014/065856, dated Oct. 13, 2015, 6 pages.
International Searching Authority, U.S. Patent and Trademark Office, International Search Report and Mitten Opinion for PCT/US2015/037563, dated Aug. 20, 2015, dated Aug. 31, 2015, 11 pages.
International Searching Authority, U.S. Patent and Trademark Office, Written Opinion of International Preliminary Examining Authority for PCT/US2014/072412, dated Dec. 4, 2015, 5 pages.
International Searching Authority, U.S. Patent and Trademark Office, International Search Report and Mitten Opinion for PCT/US2014/072413 dated Jul. 16, 2015, 16 pages.
International Searching Authority, U.S. Patent and Trademark Office, Written Opinion of the International Preliminary Examining Authority for PCT/US2014/072413 dated Dec. 17, 2015, 6 pages.
International Seraching Authority, U.S. Patent and Trademark Office, International Search Report and Witten Opinion for PCT/US2015/062851, dated Jan. 28, 2016, dated Feb. 5, 2016, 11 pages.
International Preliminary Examining Authority, International Preliminary Report on Patentability for PCT/US2014/065856, dated Feb. 10, 2016, 8 pages.
International Preliminary Examining Authority, Second Written Opinion of the International Preliminary Examining Authority for PCT/2014/065856, dated Oct. 13, 2015, 6 pages.
Office Action Issued in Columbian Patent Application No. NC2016/0000122, dated Aug. 19, 2016, 2 pages.
"Low SAR Solution for Tablet PC", Published on: Sep. 27, 2011, Available at: http://www.auden.com.tw/TRC/webspace/disk/AudenSARSolutiondatasheet_110927.pdf.
Rogerson, James, "Samsung reveals a folding phone-to-tablet prototype", http://www.techradar.com/us/news/phone-and-communications/mobile..nes/samsung-reveals-a-folding-phone-to-tablet-prototype-1197384, 7 pages.
Mercer, et al., "Dynamic Antenna Power Control for Multi-Context Device", U.S. Appl. No. 14/987,964, Filed Date: Jan. 5, 2016, 52 pages.
"Non-Final Office Action", U.S. Appl. No. 14/152,652, Jul. 16, 2015, 9 pages.
"Non-Final Office Action", U.S. Appl. No. 14/152,086, Jul. 22, 2015, 13 pages.
"Non-Final Office Action", U.S. Appl. No. 14/152,529, Sep. 22, 2015, 18 pages.
"Non-Final Office Action", U.S. Appl. No. 13/918,846, Sep. 23, 2015, 16 pages.
"Non-Final Office Action", U.S. Appl. No. 14/152,086, Nov. 30, 2015, 19 pages.
"Non-Final Office Action", U.S. Appl. No. 14/562,212, Dec. 18, 2015, 16 pages.
"Non-Final Office Action", U.S. Appl. No. 14/927,287, Dec. 21, 2015, 28 pages.
"Final Office Action", U.S. Appl. No. 14/152,652, Dec. 23, 2016, 9 pages.
"Non-Final Office Action", U.S. Appl. No. 14/320,320, Jan. 21, 2016, 9 pages.
"Non-Final Office Action", U.S. Appl. No. 14/152,529, Jan. 22, 2016, 18 pages.
Office Action Issued in United Kingdom Patent Application No. 1219096.3, dated Jan. 28, 2016, 4 pages.
"Final Office Action", U.S. Appl. No. 13/918,846, Mar. 2, 2016, 20 pages.
"Non-Final Office Action", U.S. Appl. No. 14/152,652, Apr. 18, 2016 9 pages.

(56) References Cited

OTHER PUBLICATIONS

"Final Office Action Issued in U.S. Appl. No. 14/927,287", dated May 11, 2016, 34 pages.
"Non-Final Office Action", U.S. Appl. No. 14/086,866, dated May 19, 2016, 7 pages.
Office Action Issued in Chinese Patent Application No. 201380055749.X, dated Jun. 6, 2016, 12 pages.
"Non-Final Office Action", U.S. Appl. No. 13/918,846, Jun. 14, 2016, 21 pages.
"Final Office Action", U.S. Appl. No. 14/562,212, Jun. 17, 2016, 17 pages.
"Non-Final Office Action", U.S. Appl. No. 14/506,478, Jul. 1, 2016, 10 pages.
"Final Office Action", U.S. Appl. No. 14/320,320, Jul. 29, 2016, 10 pages.
International Searching Authority, United States Patent and Trademark Office, International Search Report and Written Opinion for Application No. PCT/US2013/066441, dated Dec. 12, 2013, 12 pages.
International Preliminary Examining Authority, United States Patent and Trademark Office, International Preliminary Report on Patentability, Application No. PCT/US2013/066441, dated May 7, 2015, 9 pages.
Second Written Opinion Issued in PCT Application No. PCT/US2014/072411, dated Nov. 26, 2015, 7 pages.
International Searching Authority, U.S. Patent and Trademark Office, Second Written Opinion of the International Preliminary Examining Authority for PCT/US2014/072414 dated Dec. 9, 2015, 29 pages.
International Preliminary Report of Patentability issued in PCT Application No. PCT/US2014/072412; dated Mar. 22, 2016, 7 pages.
International Preliminary Examining Authority, International Preliminary Report on Patentability for PCT/US2014/072411; dated Mar. 23, 2016, 8 pages.
International Preliminary Examining Authority, International Preliminary Report on Patentability for PCT/US2014/072414; dated Mar. 23, 2016, 7 pages.
International Preliminary Examining Authority, International Preliminary Report on Patentability for PCT/US2014/072413, dated Mar. 24, 2016, 7 pages.
International Preliminary Examining Authority, Second Written Opinion of the International Preliminary Examining Authority for PCT/2015/037563, dated Jun. 1, 2016, 5 pages.
Second Written Opinion Issued in PCT Application No. PCT/US2015/052769, dated Jul. 7, 2016, 5 pages.
Ban, et al., "A Dual-Loop Antenna Design for Hepta-Band WWAN/LTE Metal-Rimmed Smartphone Applications", In Journal of IEEE Transactions on Antennas and Propagation, vol. 63, Issue 1, Jan., 2015, 8 pages.
Chung, et al., "A dual-mode antenna for wireless charging and Near Field Communication", In Proceedings of EEE International Symposium on Antennas and Propagation & USNC/URSI National Radio Science Meeting, Jul. 24, 2015, 5 pages.
Design of Printed Trace Differential Loop Antennas, http://www.silabs.com/Support%20Documents/TechnicalDocs/AN639.pdf, Retrieved on: Nov. 17, 2016, 28 pages.
Mumcu, et al., "Small Wideband Double-Loop Antennas Using Lumped Inductors and Coupling Capacitors", In Journal of IEEE Antennas and Wireless Propagation Letters, vol. 10, Feb. 4, 2011, 5 pages.
Osoinach, Bryce, "Proximity Capacitive Sensor Technology for Touch Sensing Applications", In White Paper of Proximity Sensing, 2007, 7 pages.
Pal, et al., "A low-profile switched-beam dual-band capacitively coupled Square Loop Antenna", In Proceedings of Antennas and Propagation Conference, Nov. 11, 2013, 5 pages.
Pal, et al., "Dual-Band Low-Profile Capacitively Coupled Beam-Steerable Square-Loop Antenna", In Journal of IEEE Transactions on Antennas and Propagation, vol. 62, Issue 3, Mar., 2014, pp. 1204-1211.
Quddious, et al., "An inkjet printed meandered dipole antenna for RF passive sensing applications", In Proceedings of 10th European Conference on Antennas and Propagation, Apr., 2016, 4 pages.
"Non-Final Office Action", U.S. Appl. No. 14/086,866, dated Oct. 17, 2016, 7 pages.
"Final Office Action", U.S. Appl. No. 13/918,846, Oct. 26, 2016, 25 pages.
"Non-Final Office Action", U.S. Appl. No. 14/987,964, dated Nov. 30, 2016, 8 pages.
First Office Action and Search Report Issued in Chinese Patent Application No. 201480031132.9, dated Nov. 2, 2016, 10 pages.
First Office Action Issued in Chinese Patent Application No. 201480033869.4, dated Dec. 19, 2016, 6 pages.
International Preliminary Examining Authority, International Preliminary Report on Patentability for PCT/US2015/037563, dated Sep. 13, 2016, 11 pages.
International Preliminary Examining Authority, International Preliminary Report on Patentability for PCT/US2015/052769, dated Sep. 29, 2016, 16 pages.
"Second Written Opinion Issued in PCT Application No. PCT/US2015/062851", dated Oct. 28, 2016, 8 pages.
Standing, et al., "Radiofrequency-Wave-Transparent Capacitive Sensor Pad", U.S. Appl. No. 15/384,742, Filed Date: Dec. 20, 2016, 26 pages.
Harper et al., "Active Proximity Sensor With Adaptive Electric Field Control", U.S. Appl. No. 15/413,196, Filed Date: Jan. 23, 2016, 35 pages.
Harper, "Loop Antenna With Integrated Proximity Sensing", U.S. Appl. No. 15/412,997, Filed Date: Jan. 23, 2016, 32 pages.
Monebhurrun, et al., "A Novel Measurement Procedure for the Specific Absorption Rate Conformity Assessment of WiFi Devices", In Proceedings of Asia Pacific Microwave Conference, Dec. 1, 2009, pp. 401-404.
"Second Office Action Issued in Chinese Patent Application No. 201380055749.X", dated Jan. 25, 2017, 10 pages.
International Preliminary Examining Authority, International Preliminary Report on Patentability for PCT/US2015/062851, dated Feb. 22, 2017, 19 pages.
International Searching Authority, U.S. Patent and Trademark Office, International Search Report and Written Opinion for PCT/US2016/069056, dated Mar. 31, 2017, 17 pages.
Office Action and Search Report Issued in Chinese Patent Application No. 201480063903.02, dated Apr. 19, 2017, 11 pages.

* cited by examiner

PREDICTIVE TRANSMISSION POWER CONTROL FOR BACK-OFF

BRIEF DESCRIPTIONS OF THE DRAWINGS

DETAILED DESCRIPTIONS

Consumer electronic devices may be equipped with wireless communication circuitry that emits radio frequency (RF) electromagnetic fields that can be absorbed by human tissue in close proximity to the wireless communication circuitry. For example, the wireless communications circuitry may transmit and receive RF signals in mobile telephone RF bands, WiFi network RF bands, GPS RF bands, etc. To protect humans from harmful levels of RF radiation when using such devices, government agencies have imposed regulations limiting RF transmission power from some wireless electronic devices, such as tablet computers and mobile phones.

In some jurisdictions, specific absorption rate (SAR) standards are in place that impose maximum energy absorption limits on electronic device manufacturers. These standards impose restrictions on the amount of electromagnetic radiation that may be emitted at any particular point within a given distance of a transmitting radio frequency (RF) antenna. Particular attention is given to radiation limits at distances within a few centimeters from the device (e.g., 0-3 centimeters), where users are likely to place a human body part near the transmitting antenna. Such restrictions may be satisfied by reducing transmitted carrier signal strength when a dielectric body (e.g., a human body part) is detected in the proximity of the transmitter. Such proximity detection can be performed in a variety of ways, such as capacitive sensing or other means of measuring signal interference.

While reducing transmitted carrier signal strength may ensure user safety and/or compliance with local safety regulations, significant reductions in the transmitted carrier signal strength can result in decreased device performance, including without limitation dropped connections (e.g., a dropped call) and/or delays in the transmission of other information. The disclosed technology maximizes a transmission signal strength while controlling transmission energy of an electronic device to remain, on average, below a predetermined safety threshold. According to one implementation, a predictive methodology uses a variety of inputs to determine a nonlinear "back-off" function that gives preference to critical transmissions and mitigates a number of resulting dropped connections and other performance issues.

Implementations described and claimed herein provide a wireless transmission system that predicts an average energy emanating from an electronic device over a time interval and determines a non-linear back-off function defining at least one transmission power reduction. When transmission power is adjusted according to back-off function, the predicted average energy of the future time interval is adjusted to satisfy a power condition, thereby ensuring compliance with one or more regulatory standards.

Figure 1:
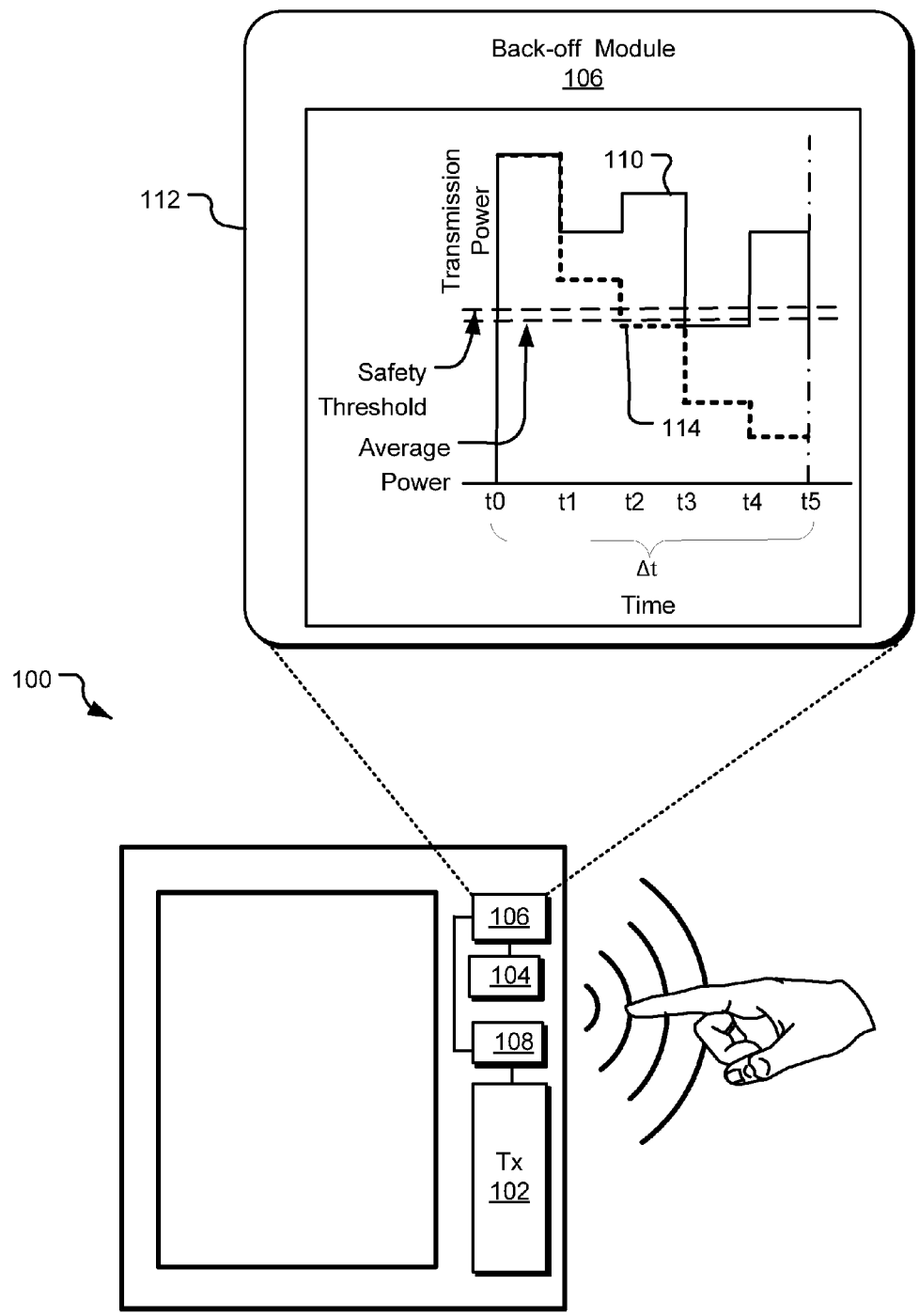
FIG. 1 illustrates an example electronic device that determines and implements a back-off function to maximize transmission power while controlling a total average transmission power so as to not exceed a predetermined power threshold.

FIG. 1 illustrates an example electronic device 100 that determines and implements a back-off function to maximize transmission power while controlling a total average transmission power so as to not exceed a predetermined power threshold. The electronic device 100 may be without limitation a tablet computer, laptop, mobile phone, personal data assistant, cell phone, smart phone, Blu-Ray player, gaming system, wearable computer, home or enterprise appliance, or any other device including wireless communications circuitry for transmission of an RF carrier wave. The electronic device 100 includes an RF transmitter 102 (including a transmitting antenna) that transmits a carrier wave. In one implementation, the carrier wave has a frequency in the range of a mobile telephone RF transmission (e.g., several hundred megahertz (MHz)). Other implementations are also contemplated. In the illustrated implementation, the electronic device 100 represents a tablet computer having mobile telephone RF capabilities.

The RF transmitter 102 is capable of transmitting at a variety of different power levels. A power controller 108 varies the transmission power of the RF transmitter 102 responsive to receipt of power instructions from a base station (not shown) and/or instructions from a back-off module 106. For example, a base station may instruct the electronic device 100 to transmit at different power levels based on the location of the electronic device 100 relative to the base station. Lower power levels may be suitable for communications when the electronic device 100 is in a close proximity to the base station, while a higher or maximum power level may be requested by the base station when the electronic device 100 is further away from the base station.

In some instances, the power controller 108 receives power instructions from the back-off module 106 rather than the base station. In general, the back-off module 106 instructs the power controller 108 to alter the power of the RF transmitter 102 when a proximity event occurs at a time when power emissions of the RF transmitter 102 are predicted to exceed a predetermined energy threshold. A "proximity event" refers to, for example, a detection of a dielectric object such as a human body part within a threshold distance of the RF transmitter 102. Proximity events of the electronic device 100 are detected by a proximity sensor 104 that utilizes one or more suitable sensing technologies (capacitive sensing, infrared sensing, transmission signal reflection, etc.) for detecting the presence of a dielectric object. A proximity event is triggered when measurements of the proximity sensor 104 indicate that one or more proximity conditions are satisfied.

In various implementations, the proximity sensor 104 has different sensing capabilities. For example, the proximity sensor 104 may be able to determine whether an object in proximity of the RF transmitter 102 is human, non-human (e.g., a dog), or inanimate (e.g., a chair). In another implementation, the proximity sensor 104 determines a type of object such as whether the object triggering the sensor is a hand, leg, user's head, torso, etc. This object-type determination capability can be useful in jurisdictions where SAR standards vary based on the type of object. For example, regulations may impose a greater reduction in transmitter power if the object is a user's torso rather than a user's hand.

Other sensors in devices may be used to distinguish object types. For example, 2D and 3D cameras installed on computing devices or located proximate to computing devices may capture images that are processed to determine whether an object is a certain type.

The proximity sensor 104 sends proximity event information to the back-off module 106, and the back-off module 106 uses the proximity event information and/or a variety of other inputs to determine an applicable safety standard. In one implementation, the back-off module 106 models an amount of energy expected to emanate from the RF transmitter 102 over a predetermined future time interval referred to herein as a "response interval." The response interval may refer to, for example, a time allotted by a regulatory authority to take appropriate response (e.g., reduce transmission power) responsive to detection of a proximity event that violates a regulatory safety standard.

In FIG. 1, predictive modeling activity of the back-off module 106 is illustrated in exploded view 112 via a plot of predicted transmission power 110 (e.g., the plotted solid line) over a response interval $\Delta t$ (e.g., t0 to t5). The predicted transmission power 110 is based on inputs from one or more sources such as the proximity sensor 104, a nearest base station, receiving tower, feedback from the power controller 108, etc. Types of input useful for computing the predicted transmission power 110 include without limitation transmitting frequency, transmitting band, modulation scheme, GPS location of the electronic device 100, channel conditions (e.g., conditions relating to quality and interference in signal communications with a base station), scheduled channel activities, current channel activities, ambulation characteristics of the electronic device 100, current transmission power, expected changes in transmission power, etc.

In one implementation, the back-off module 106 continuously computes the predicted transmission power 110 for a response interval ($\Delta t$), which may be a rolling time window. For example, the back-off module 106 computes the predicted transmission power 110 for a time interval spanning the next 30 seconds and, after one time period (e.g., a second) passes, re-computes the predicted transmission power 110 for the next 30 time periods. In some implementations, the back-off module 106 computes the predicted transmission power 110 for the response interval ($\Delta t$) by taking into account information pertaining to past transmissions or expected future transmissions outside of the response interval ($\Delta t$). For example, computation of the predicted transmission power 110 for the next 30 time periods may entail some consideration of transmission activities that occurred over the previous hour.

When the proximity sensor 104 detects a proximity event (e.g., by satisfaction of a proximity condition), the back-off module 106 determines a degree of transmission power reduction to impose in order to reduce predicted transmission power 110 of the RF transmitter 102 by an amount sufficient to facilitate compliance with an applicable safety standard, such as a SAR standard set by a local regulation authority. Because SAR standards vary widely between jurisdictions and also based on the type and distance of object detected, the back-off module 106 may select an applicable safety standard based on the specific circumstances of each detected proximity event.

The transmission power plot of exploded view 112 further indicates a safety threshold corresponding to an applicable safety standard that is selected by the back-off module 106. In one implementation, the safety threshold corresponds to a maximum average energy emanating from the RF transmitter 102 than can permissibly be absorbed by an object in proximity to the RF transmitter 102 during a determined response interval (e.g., $\Delta t$). For example, the U.S. Federal Communications Commission (FCC) imposes a regulation under which phones sold in the United States have an average SAR level at or below 1.6 watts per kilogram (W/kg) taken over the volume containing a mass of 1 gram of tissue that is absorbing the most signal. Different regulations may be imposed for different types of devices (e.g., phone, tablet computer, etc.) and for different body parts (e.g., torso, hands, legs) in proximity of the RF transmitter 102.

In at least one implementation, the safety threshold is based on a default stored value. Information used to determine the safety threshold may include, for example, a specific type of object triggering the proximity event, a known distance to the triggering object, the type of the electronic device 100, the geographical location in which the electronic device 100 is located, etc. In at least one implementation, the safety threshold represents a threshold absorption rate accounting for aggregated transmissions of multiple transmitters operating on the electronic device 100.

The back-off module 106 uses the safety threshold and the predicted transmission power 110 to compute or otherwise determine a "back-off function" (e.g., an example back-off function 114) to impose over the response interval ($\Delta t$). As used herein, "back-off function" refers to a mathematically described reduction in transmission power that may be static or a dynamic (time-varying) function. When summed with the predicted transmission power 110, the back-off function reduces the predicted transmission power 110 over the response interval ($\Delta t$) so that the average transmission power of the electronic device during the response interval (see, e.g., "Average Power" in exploded view 112) is at or below the safety threshold. In one implementation, the back-off function is a step function that gradually reduces the predicted transmission power 110 in multiple "steps" over the response interval ($\Delta t$). The various steps may be of variable and/or adaptive step size.

The back-off function is selected so as to minimize the total amount of back off implemented over the response interval $\Delta t$. For example, the back-off module 106 may identify scheduled decreases in transmission power and determine that such decreases offset or partially offset scheduled increases in transmission power. Consequently, the back-off module 106 may determine that it is permissible for transmitted power to exceed the safety threshold in some instances because such overshoot is offset by lower power periods in other instances.

In one implementation, the back-off function is selected so as to maximize the total transmission power of the electric device (e.g., a total integral of the predicted transmission power 110 taken over $\Delta t$), while allowing for compliance with the applicable safety standard. Such maximization increases device performance by reducing transmission delays, dropped calls, etc.

In one implementation, the back-off function prioritizes critical transmissions over non-critical transmissions. For example, the back-off function can elect to distribute a total amount of back off such that more back off is imposed during non-critical transmission than during critical transmissions. Critical transmissions may refer to, for example, voice calls, an emergency services call (e.g., a 911 call), an in-process call involved in a hand-over process between cell towers or base stations, etc. In contrast to critical transmissions, non-critical transmissions may refer to, for example, scheduled periodic data "checks" with a base station to check for new email messages, software updates, and other automatic data downloads.

If the proximity sensor 104 detects a proximity event during a critical transmission, the back-off module 106 may select a back-off function that imposes a small or zero degree of back-off during the immediate critical transmission (e.g., t0 to t1) and a larger degree of back-off at later times (e.g., t2 to 5) when non-critical transmissions are scheduled to occur. For example, the back-off module 106 may be able to readily determine an exact amount of transmission power back off that causes a call to be dropped at a given time. Using such information, the back-off module 106 can elect to intelligently distribute back-off across the response interval $\Delta t$ so as to avoid dropping the call or to delay an inevitable call drop until the exact moment when transmission power bumps the "average power" of the response interval $\Delta t$ above the safety threshold.

Responsive to detection of a proximity event, the back-off module 106 determines and communicates the back-off function to the power controller 108. The power controller 108 adjusts the transmission power of the RF transmitter 102 according to the back-off function. In some instances, transmitter power may not be reduced when a proximity event is detected. For example, the back-off module 106 may determine not to impose a back-off during the response interval ($\Delta t$) because the electronic device 100 is currently transmitting at a relatively low power and transmission power is not expected to increase or spike so as to cause the average power to exceed the Safety Threshold during the response interval.

In one implementation, the back-off module 106 continuously re-computes a "best" back-off function and dynamically alters a currently-imposed back-off function to maximize a total transmission power and/or mitigate interference with critical transmissions. For example, the back-off module 106 may recognize that if a current voice call ends within 15 seconds or less, reductions in transmitter power can be imposed during the end of the interval $\Delta t$ that are sufficient to reduce the average transmission power of the response interval $\Delta t$ to at or below the safety threshold. If the call is still in progress near the end of the 15 seconds, the back-off module 106 can then elect to dynamically alter the implemented back-off function and reduce transmitter power immediately during the critical transmission to ensure that the applicable safety standard is not violated.

In one implementation, special priority is given to emergency communications (e.g., 911 calls). If an emergency communication is initiated or ongoing at a time when a proximity event is detected by the proximity detector 104, the back-off module 106 determines a back-off function that does not permit power adjustments that interfere with the emergency communication. For example, the back-off module 106 may select a back-off function that reduces transmission power associated with other scheduled and/or concurrent transmissions. If such reductions are insufficient to facilitate compliance with the applicable safety standard, the back-off module 106 may allow for violation of the safety standard. For example, a user may trigger an emergency override condition, such as by pressing a button on the electronic device 100 or by providing specific input (e.g., typing 911) indicating occurrence of an emergency condition.

Furthermore, transmission power need not be kept at the highest level to complete an emergency call. A small reduction in transmission power may still allow the emergency call to continue and can potentially constitute the start of the controlled proximity back off algorithm. If, however, the emergency call experiences a poor connection (risking a dropped call) and/or takes longer than the time allowed for back off to an acceptable transmission power, the system may opt to override the back off process until the emergency call has ended naturally (e.g., one party to the call disconnects).

Although the example back-off function 114 of FIG. 1 includes a series of "steps" defining a gradual decrease transmission power throughout the response interval $\Delta t$, other back-off functions may take on other forms. For example, the back-off module 106 may initially (e.g., between t0 and t2) decrease transmission power significantly and impose little or no back off at a later time during the response interval $\Delta t$ (e.g., between t3 and t5). In such case, the back-off function may have the appearance of a step function that increases in transmission power throughout the time interval $\Delta t$ between t0 and t5. In other implementations, the back-off function climbs to a maximum before decreasing; decreases and then increases; or sequentially increases and decreases (or vice versa) one or more times.

Figure 2:
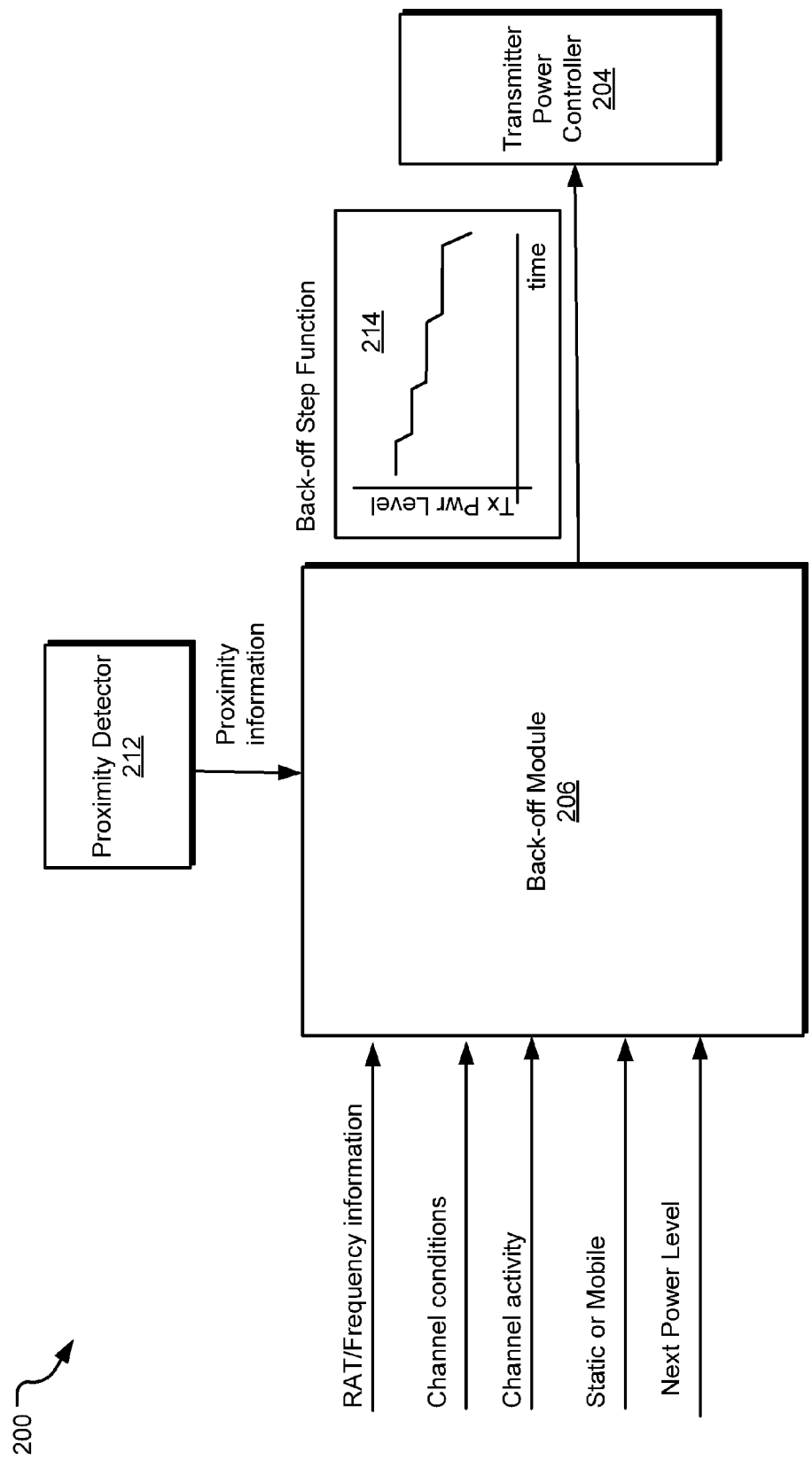
FIG. 2 illustrates an example system for predictive power modeling and dynamic power control in an electronic device.

FIG. 2 illustrates an example system 200 for predictive power modeling and dynamic power control in an electronic device. The system 200 includes a back-off module 206 that continuously evaluates a stream of inputs to predictively model an amount of energy expected to emanate from the electronic device over a response interval. In one implementation, the response interval is an FCC-specified timer interval for reducing transmission power in response to detection of a proximity event.

Based on the predictive model, the back-off module 206 determines and dynamically adjusts a back-off step function (e.g., an example back-off step function 214) that can be implemented to ensure compliance with an applicable safety standard. The applicable safety standard may be a default safety standard or a safety standard determined in real-time based on inputs received from a proximity detector 212. For example, the proximity detector 212 may determine a general type of object (e.g., human/non-human) triggering a proximity event and/or details regarding the object, such as whether the object is a limb, torso, head, etc. Using the proximity event information, the back-off module 206 can define or refine a previously-selected safety standard (e.g., a default standard).

In one implementation, the back-off module 206 initially selects and/or modifies the applicable safety standard by analyzing information from the proximity detector 212 along with location information from a GPS unit (not shown). For example, the United Kingdom and the United States may impose different SAR standards for a human torso in proximity to an RF transmitter. Therefore, GPS information can be used to identify an appropriate legal or regulatory jurisdiction and a corresponding set of safety standards from which the back-off module 206 selects the applicable safety standard.

While a transmitter of the electronic device is actively transmitting, the back-off module 206 determines a current amount of energy emanating from the electronic device and a corresponding specific absorption rate (SAR) for an object in proximity of one or more transmitting antennas. For example, the current amount of energy emanating from the device can be determined based on transmission characteristics such as current transmission frequency information (e.g., current cellular band, cellular frequency), current transmission power, and information identifying the Radio Access Technology (RAT) supporting the electronic device (e.g., 3G, 4G, LTE, Bluetooth, WiFi, etc.). Different transmission frequencies may correspond to different SARs; therefore, such transmission characteristics can be useful in determining or estimating the actual SAR potentially affecting body tissue in close proximity to the electronic device.

In one implementation, the back-off module 206 accesses one or more tables to determine a mapping between a maximum transmission power and a safe transmission power for a current transmission frequency. The "safe transmission power" is a value approximated based on the applicable safety standard. For example, a stored table may indicate a set amount by which to reduce transmission power throughout the duration of a predetermined time interval (e.g., the FCC timer-based interval) to comply with the applicable safety standard. In one such implementation, a table stores back-off values derived based on an assumption of steady state transmission characteristics (e.g., without consideration of time-dependent back-off adjustments). The back-off module 206 identifies one or more relevant back-off values from the stored table and uses such values as a baseline (e.g., a starting point) for intelligently adjusting and distributing the back-off (e.g., via the back-off step function 214) throughout a response interval.

Derivation and dynamic modification of the back-off step function is performed based on analysis of a variety of inputs continuously received by the electronic device. Among such inputs, the back-off module 206 analyses channel conditions that quantify signal quality between the electronic device and a transmitting entity, such as a tower or base station. Example channel conditions include without limitation Received Signal Strength Indicator (RSSI) quality estimates, channel path loss estimates, channel quality indicators (CQIs), and fading conditions. For example, a fading condition may tend to indicate that the electronic device is traveling away from corresponding transmission tower, and that the transmission tower is likely to request that the electronic device increase transmission power at a set point in time in the near future. To accommodate for the expected transmission power increase, the back-off module 206 may determine a back-off step function that imposes a greater degree of back off prior to the scheduled power increase.

In another implementation, a weak RSSI indicates that a voice call may be dropped at a relatively low power level. The back-off module 206 selects a back-off step function that ensures a minimum baseline power throughout the response interval or as long as possible so as to prevent dropping of the call or to mitigate a likelihood that the call is dropped. As the electronic device continually receives updates indicating signal improvement and/or worsening, the back-off module 206 dynamically adjusts the back-off function to maximize transmission power to an extent possible while facilitating continued compliance with the applicable safety standard.

The back-off step function may be derived based on a consideration of scheduled channel activities during the response interval. Scheduled channel activities may refer to, for example, scheduled critical and non-critical transmissions, as well as information describing whether the electronic device is in a "handover" (e.g., handoff) mode between two different RAT networks. If, for example, control of the electronic device is transferred between a cellular network and a WiFi network, an applicable safety standard may change at the time of the handoff. For example, SARs standards in the United States apply to cellular transmissions but not WiFi transmissions. Accordingly, the back-off module 206 may determine not to impose back off during the first portion of a response interval because the electronic device is about to be transferred to an RAT network for which the currently-applicable safety standard is no longer relevant.

Further, the back-off module 206 also receives and analyzes ambulatory information indicating whether the electronic device is static or mobile. Movement of the mobile device can be determined from a variety of factors including Assisted GPS, data from inertial measurement devices (accelerometers, gyroscopes, and compasses, for example), base station information, including handover or handoff events, etc. If, for example, the electronic device is moving away from a corresponding transmitter, the back-off module 206 may be able to determine a likelihood that the corresponding transmitter will request an increase in transmission power of the electronic device in the near future. Likewise, if the electronic device is moving toward a corresponding transmitter, the back-off module 206 may be able to determine a time at which an increased degree of back off can be imposed without interfering with a critical transmission. Such information can be used to adaptively vary the "steps" in the resulting back-off step function 214.

Further still, the back-off module 206 also generates the back-off step function 214 based on actual current and predicted transmission power levels of the electronic device. The back-off module 206 may receive information regarding the "next power level" of all different wireless transmitters of the electronic device. Such information may be communicated between the mobile device and one or more base stations in a closed control power loop.

For each identified "special circumstance" (e.g., each scheduled channel activity, atypical channel condition, identified "hand-off", etc.), the back-off module 206 evaluates and selects one or more corresponding power levels (e.g., steps of the back-off step function). Collectively, the various power levels of the back-off step function 214 are selected to maximize performance of the electronic device over a response interval while facilitating compliance with the applicable safety standard. Such performance maximization is achieved, for example, by maximizing transmission power of the electronic device throughout the duration of the response interval and/or by mitigating interference with critical transmissions.

The back-off module 206 determines and communicates the back-off function to a power controller 204 that adjusts the transmission power of the electronic device according to the back-off function.

Figure 3:
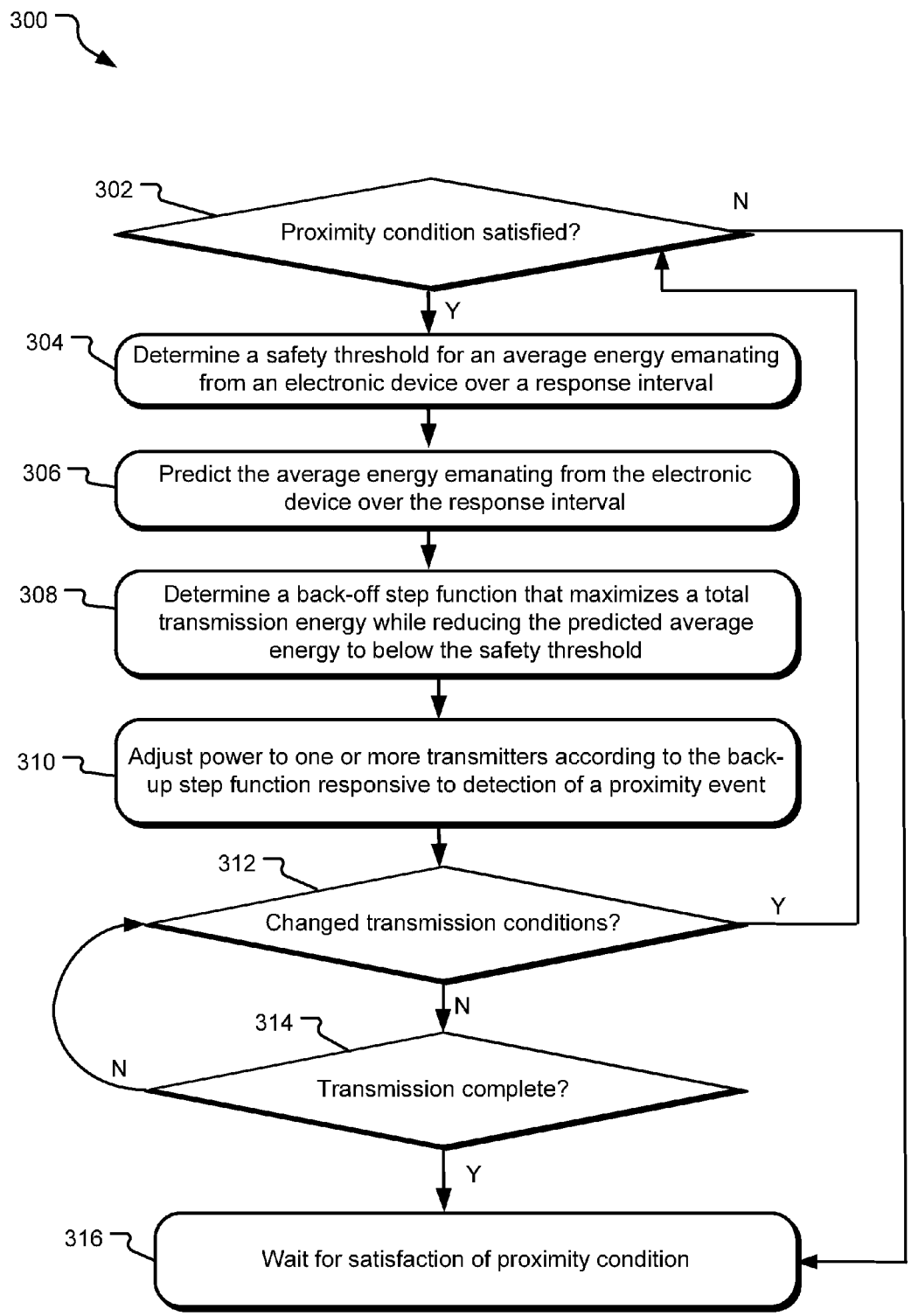
FIG. 3 illustrates example operations for determining and implementing a back-off function to maximize average transmission power of an electronic device while controlling total average transmission power so as to not exceed a predetermined power threshold.

FIG. 3 illustrates example operations 300 for determining and implementing a back-off function to maximize average transmission power of an electronic device while controlling a total average transmission power so as not to exceed a predetermined threshold. A decision operation 302 decides whether a proximity condition is satisfied. For example, a proximity condition may be satisfied when a dielectric object is detected in the presence of a device transmitter during an active transmission of the transmitter. Detection of the proximity condition satisfaction may be accomplished using a plurality of suitable techniques including without limitation capacitive sensing, transmission signal reflection, etc. If the decision operation 302 decides that the proximity condition is not satisfied, a waiting operation 316 commences a wait for satisfaction of the proximity condition.

If the decision operation 302 decides that the proximity condition is satisfied, a determination operation 304 determines a safety threshold defining a maximum permissible average energy emanating from an electronic device over a response interval. In one implementation, a default safety threshold is assumed. In another implementation, the safety threshold is determined and/or refined in real-time responsive to detection of a proximity event and/or receipt of information from a proximity detector. For example, a proximity detector may collect data identifying a specific type of object that triggered an event (e.g., a human arm), and an applicable safety standard (e.g., an SAR regulation) can be selected accordingly. In one implementation, GPS information is used to supplement proximity detector data so as to allow for selection of the applicable safety standard based on identification of a governing regulatory authority.

A prediction operation 306 predicts the average energy emanating from the electronic device over the response interval. Such prediction takes into account a variety of conditions and considerations including without limitation transmission characteristics (e.g., current transmission power, transmission frequency, transmission band, RAT technology), channel conditions, scheduled channel activities, detectable "handovers" of the device from one RAT network to another; ambulatory conditions regarding movement of the electronic device, expected transmission power changes of one or more antennas on the electronic device, etc. In one implementation, the predicted average energy emanating from the electronic device is a total aggregated energy output from multiple transmitters.

Another determination operation 308 determines a back-off step function that maximizes a total transmission energy while reducing the predicted average transmission energy of the response interval to below the safety threshold. In one implementation, the back-off step function has a variable and/or adaptive step size with steps selected to maximize device performance in relation to one or more identified channel conditions, channel activities, static or dynamically altering transmission characteristics, etc. For example, the back-off function may prioritize critical transmissions over non-critical transmissions and include one or more back-off steps sized to mitigate interference with a critical transmission. Interference with a critical transmission is mitigated when, for example, power reductions are timed to effect non-critical transmissions disproportionately more than critical transmissions.

An adjustment operation 310 adjusts power to one or more transmitters of the electronic device according to the back-off step function. In some circumstances, the back-off function may indicate that compliance with an applicable safety standard (e.g., average energy at or below the determined safety threshold) can be achieved without reducing transmitter power. In such case, the adjustment operation 310 does not adjust power to one or more transmitters responsive to detection of the proximity event.

An input analysis operation 312 continually analyzes newly-received inputs to determine whether any transmission conditions of the electronic device have changed. For example, the input analysis operation 312 may determine whether there are changed channel activities, channel conditions, or transmission characteristics (e.g., transmission power changes via request of a base station, transmission frequency changes), etc. If the input analysis operation 310 determines that there are changed transmission conditions, the decision operation 302 decides whether the proximity condition is still satisfied. If the proximity condition is still satisfied, operations 304 through 310 are repeated, and the back-off function is dynamically updated based on the changed transmission conditions. If the proximity condition is no longer satisfied, a waiting operation 316 commences to wait for satisfaction of a proximity condition during a next transmission of the electronic device.

If the input analysis operation 312 determines that there are not any changed transmission conditions, another determination operation 314 determines whether the electronic device continues to transmit data. If the electronic device continues to transmit data, the input analysis operation 312 repeats a check for changed transmission conditions.

If the determination operation 314 determines that the electronic device is no longer transmitting data, the waiting operation 316 commences to wait for satisfaction of a proximity condition during a next transmission of the electronic device.

Figure 4:
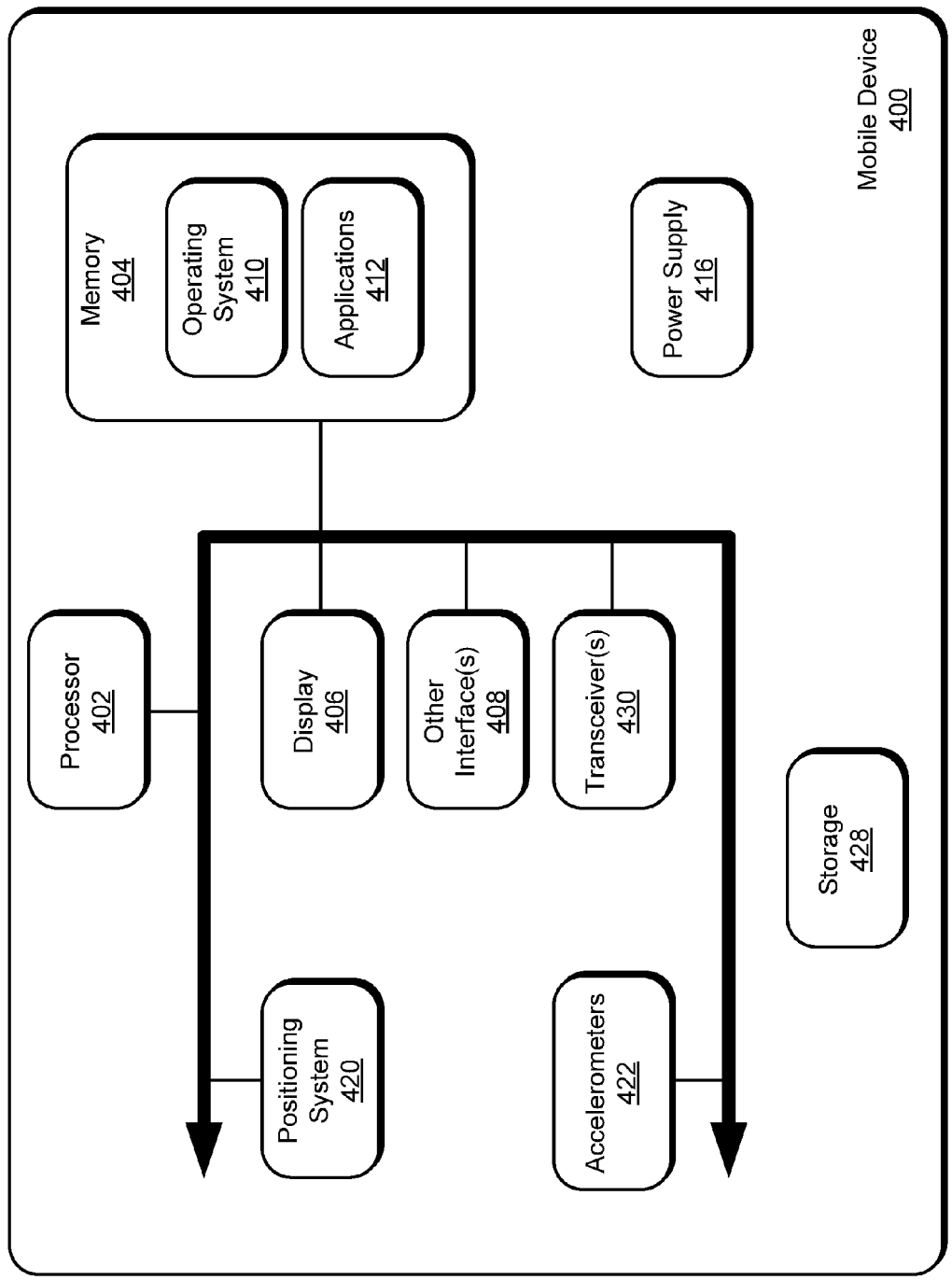
FIG. 4 illustrates example system that may be useful in implementing the described technology.

FIG. 4 illustrates example system (labeled as a mobile device 400) that may be useful in implementing the described technology. The mobile device 400 includes a processor 402, a memory 404, a display 406 (e.g., a touch-screen display), and other interfaces 408 (e.g., a keyboard). The memory 404 generally includes both volatile memory (e.g., RAM) and non-volatile memory (e.g., flash memory). An operating system 410, such as the Microsoft Windows® Phone operating system, resides in the memory 404 and is executed by the processor 402, although it should be understood that other operating systems may be employed.

One or more application programs 412 are loaded in the memory 404 and executed on the operating system 410 by the processor 402. Examples of applications 412 include without limitation a back-off module, proximity detection module, etc. The mobile device 400 includes a power supply 416, which is powered by one or more batteries or other power sources and which provides power to other components of the mobile device 400. The power supply 416 may also be connected to an external power source that overrides or recharges the built-in batteries or other power sources.

The mobile device 400 includes one or more communication transceivers 430 to provide network connectivity (e.g., mobile phone network, Wi-Fi®, BlueTooth®, etc.). The mobile device 400 also includes various other components, such as a positioning system 420 (e.g., a global positioning satellite transceiver), one or more accelerometers 422, and additional storage 428. Other configurations may also be employed.

In an example implementation, a back-off module, proximity detector, and other modules may be embodied by instructions stored in memory 404 and/or storage devices 428 and processed by the processor 402. Applicable safety standards (e.g., SAR standards) and/or tables including back-off values may be stored in memory 404 and/or storage devices 428 as persistent datastores.

The mobile device 400 may include a variety of tangible computer-readable storage media and intangible computer-readable communication signals. Tangible computer-readable storage can be embodied by any available media that can be accessed by the mobile device 400 and includes both volatile and nonvolatile storage media, removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

An example method includes determining a back-off function defining at least one transmission power adjustment. The at least one transmission power adjustment is effective to adjust a predicted average energy of an electronic device over a future time interval to satisfy a power condition. The example method also includes adjusting transmission power of the electronic device according to the back-off function responsive to satisfaction of a proximity condition.

Another example method of any previous example method wherein the back-off function is a step function.

Another example method of any previous example method wherein the back-off function prioritizes critical transmissions over non-critical transmissions.

Another example method of any previous example method wherein the back-off function maximizes a total average energy emanating from the electronic device while controlling the predicted average energy to satisfy the power condition.

Another example method of any previous example method further including defining the power condition based on a type of object triggering the proximity event.

Another example method of any previous example method further including defining the power condition based on a geographical location of the electronic device provided by a global positioning system (GPS).

Another example method of any previous example method further including predicting the average energy based on channel conditions.

Another example method of any previous example method further including predicting the average energy based on at least one of a current channel activity and a scheduled channel activity.

An example apparatus includes a back-off module that determines a back-off function defining at least one transmission power adjustment. The at least one transmission power adjustment is effective to adjust a predicted average energy of an electronic device over a future time interval to satisfy a power condition. A power controller adjusts power of at least one transmitter of the electronic device according to the back-off function.

Another example apparatus of any previous example apparatus wherein the back-off function has a variable step size.

Another example apparatus of any previous example apparatus wherein the back-off module dynamically adjusts the back-off function throughout the future time interval.

Another example apparatus of any previous example apparatus wherein the back-off function prioritizes critical transmissions over non-critical transmissions.

Another example apparatus of any previous example apparatus wherein the non-linear back-off function maximizes a total energy emanating from the electronic device while adjusting the predicted average energy to satisfy the power condition.

Another example apparatus of any previous example apparatus wherein the back-off module predicts the average energy based on at least one of a current channel activity and a scheduled channel activity.

Another example apparatus of any previous example apparatus wherein the back-off module predicts the average energy based on observed channel conditions.

Another example apparatus of any previous example apparatus wherein the back-off module defines the power condition based on a type of object triggering the proximity event.

Another example apparatus of any previous example apparatus wherein the back-off module defines the power condition based on a geographical location of the electronic device provided by a global positioning system (GPS).

Another example method includes determining a back-off step function with a variable step size. The back-off step function defines at least one transmission power adjustment effective to adjust a predicted average energy of an electronic device over a future time interval to satisfy a power condition while maximizing total transmission power of the electronic device over the future time interval. The example method further includes adjusting the transmission power according to the back-off step function responsive to detection of a proximity event.

Another example method of any previous example method wherein the back-off step function minimizes transmission power reductions that occur during critical transmissions.

Another example method of any previous example method wherein the determining the back-off step function further includes determining the back-off step function based on at least one of channel conditions and channel activities.

Another example apparatus includes means for determining a back-off function defining at least one transmission power adjustment. The at least one transmission power adjustment is effective to adjust a predicted average energy of an electronic device over a future time interval to satisfy a power condition. The example apparatus also includes means for adjusting transmission power of the electronic device according to the back-off function responsive to satisfaction of a proximity condition.

Another example apparatus of any previous example apparatus wherein the back-off function is a step function.

Another example apparatus of any previous example apparatus wherein the back-off function prioritizes critical transmissions over non-critical transmissions.

Another example apparatus of any previous example apparatus wherein the back-off function maximizes a total average energy emanating from the electronic device while controlling the predicted average energy to satisfy the power condition.

Another example apparatus of any previous example apparatus further including means for defining the power condition based on a type of object triggering the proximity event.

Another example apparatus of any previous example apparatus further including means for defining the power condition based on a geographical location of the electronic device provided by a global positioning system (GPS).

Another example apparatus of any previous example apparatus further including means for predicting the average energy based on channel conditions.

Another example apparatus of any previous example apparatus further including means for predicting the average energy based on at least one of a current channel activity and a scheduled channel activity.

Yet another example apparatus includes means for determining a back-off step function with a variable step size. The back-off step function defines at least one transmission power adjustment effective to adjust a predicted average energy of an electronic device over a future time interval to satisfy a power condition while maximizing total transmission power of the electronic device over the future time interval. The example apparatus further includes means for adjusting the transmission power according to the back-off step function responsive to detection of a proximity event.

Another example apparatus of any previous example apparatus wherein the back-off step function minimizes transmission power reductions that occur during critical transmissions.

Another example apparatus of any previous example apparatus wherein the means for determining the back-off step function further includes means for determining the back-off step function based on at least one of channel conditions and channel activities.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method comprising:
   determining a back-off function defining a sequence of transmission power adjustments for a future time interval based on at least one detected channel condition that quantifies signal quality between an electronic device and a transmitting entity, the sequence of transmission power adjustments being effective to adjust a predicted average transmission energy of the electronic device over the future time interval to satisfy a power condition defining a permissible average energy for the future interval; and
   adjusting transmission power of the electronic device according to the back-off function responsive to satisfaction of a proximity condition.

2. The method of claim 1 wherein the back-off function is a step function.

3. The method of claim 1 wherein the back-off function prioritizes critical transmissions over non-critical transmissions.

4. The method of claim 1 wherein the back-off function maximizes a total average energy emanating from the electronic device while controlling the predicted average energy to satisfy the power condition.

5. The method of claim 1 further comprising:
   defining the power condition based on a type of object triggering the proximity event.

6. The method of claim 1 further comprising:
   defining the power condition based on a geographical location of the electronic device provided by a global positioning system (GPS).

7. The method of claim 1 further comprising:
   predicting the average energy based on at least one of a current channel activity and a scheduled channel activity.

8. The method of claim 1, wherein the sequence of adjustments of the back-off function provide for an increase in the predicted energy to a value above the permissible average energy before decreasing the predicted energy to a value below the permissible average energy within the future time interval.

9. An apparatus including:
   a back-off module that determines a back-off function defining a sequence of transmission power adjustments for a future time interval based on at least one detected channel condition that quantifies signal quality between an electronic device and a transmitting entity, the sequence of transmission power adjustments being effective to adjust a predicted average transmission energy of the electronic device over the future time interval to satisfy a power condition defining a permissible average energy for the future interval; and
   a power controller that adjusts power of at least one transmitter of the electronic device according to the back-off function.

10. The apparatus of claim 9 wherein the back-off function has a variable step size.

11. The apparatus of claim 9, wherein the back-off module dynamically adjusts the back-off function throughout the future time interval.

12. The apparatus of claim 9 wherein the back-off function prioritizes critical transmissions over non-critical transmissions.

13. The apparatus of claim 9 wherein the non-linear back-off function maximizes a total energy emanating from the electronic device while adjusting the predicted average energy to satisfy the power condition.

14. The apparatus of claim 9 wherein the back-off module predicts the average energy based on at least one of a current channel activity and a scheduled channel activity.

15. The apparatus of claim 9 wherein the back-off module defines the power condition based on a type of object triggering the proximity event.

16. The apparatus of claim 9 wherein the back-off module defines the power condition based on a geographical location of the electronic device provided by a global positioning system (GPS).

17. A method comprising:
   determining a back-off step function with a variable step size, the back-off step function defining a sequence of transmission power adjustments for a future time interval based on at least one detected channel condition that quantifies signal quality between an electronic device and a transmitting entity, the sequence of transmission power adjustments being effective to adjust a predicted average transmission energy of the electronic device over the future time interval to satisfy a power condition defining a permissible average energy for the future interval while maximizing total transmission power of the electronic device over the future time interval; and adjusting the transmission power according to the back-off step function responsive to detection of a proximity event.

18. The method of claim 17 wherein the back-off step function minimizes transmission power reductions that occur during critical transmissions.

19. The method of claim 18 wherein determining the back-off step function further comprises:
determining the back-off step function based on at least one of channel conditions and channel activities.

* * * * *